Dec. 17, 1935. S. L. STARKEY 2,024,546
PLANT SUPPORT
Filed June 13, 1935
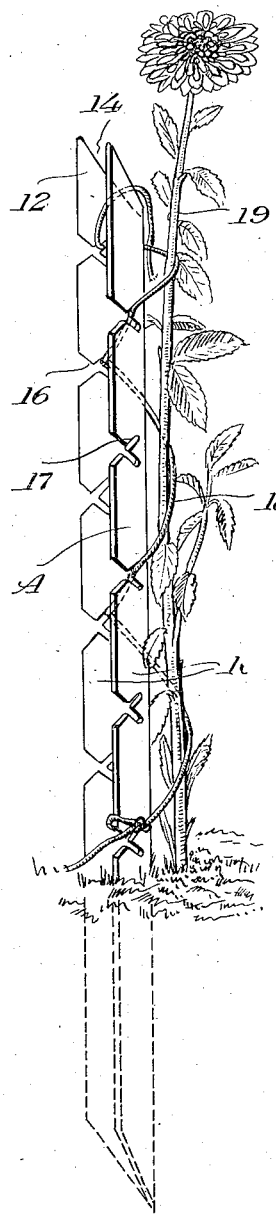
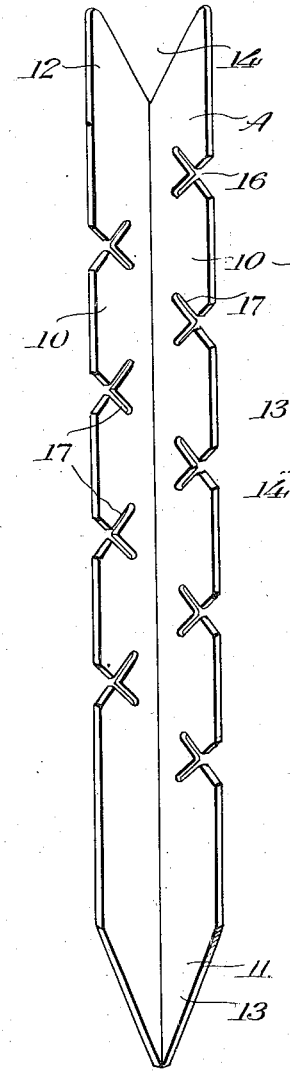
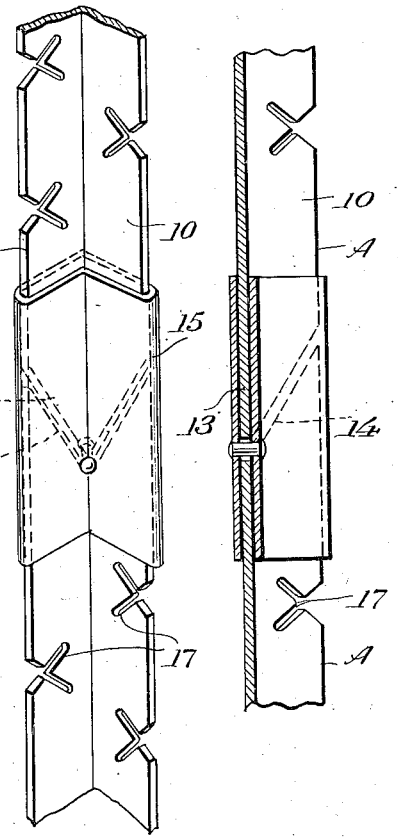
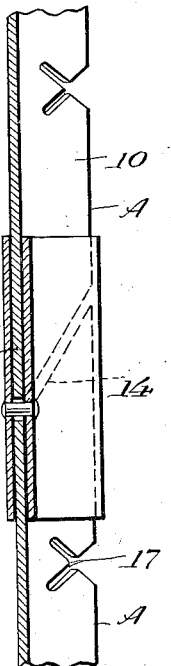
Shirley L. Starkey
INVENTOR
ATTORNEY Patented Dec. 17, 1935

2,024,546

UNITED STATES PATENT OFFICE 2,024,546

PLANT SUPPORT

Shirley L. Starkey, Milford, Conn.

Application June 13, 1935, Serial No. 26,468

4 Claims. (Cl. 47—47)

The invention relates to a plant support and more especially to an extensible plant prop.

The primary object of the invention is the provision of a support or prop of this character, wherein the same can be readily and easily driven into the ground and by the use of ordinary twine, string or cord a growing plant can be lashed thereto so as to hold it upright during the growing period.

Another object of the invention is the provision of a support or prop of this character, wherein the twine, string or cord can be secured in a convenient manner so as to hold the growing plant and during its growth the prop or support can be extended to take care of such growth until the said plant reaches full maturity.

A further object of the invention is the provision of a support or prop of this character, wherein the same has notches or seats for the twine, string or cord used for fastening the plant thereto, so that such fastener can be wrapped about the plant to steady the same when held upright by said support or prop and at the same time giving freedom to the plant during growth to full maturity.

A still further object of the invention is the provision of a support or prop of this character, which is extremely simple in construction, thoroughly reliable and efficient in operation, free from decay, possessing maximum strength, durability, and can be manufactured at a minimum expense.

With these and other objects in view the invention consists in the features of construction, combination and arrangement of parts as will be hereinafter more fully described, illustrated in the accompanying drawing which discloses the preferred embodiment of the invention and pointed out in the claims hereunto appended.

In the accompanying drawing:

Figure 1 is a perspective view of the support or prop constructed in accordance with the invention showing the same lashed to a plant.

Figure 2 is an elevation of the support or prop.

Figure 3 is an elevation of the extended support or prop.

Figure 4 is a vertical section thereof.

Similar reference characters indicate corresponding parts throughout the several views in the drawing.

Referring to the drawing in detail the support or prop comprises a channeled metal bar A, preferably of the L-shaped type in cross section to provide the right angular flanges 10 throughout the length of the same or for a major portion of such length.

The opposite ends of this bar A are reversely beveled as at 11 and 12, respectively, so that at one end will be presented a pointed tip 13, while at the other end will be a substantially V-shaped seating recess 14. When it is desired to extend the length of the bar A several of the same are brought into vertical alignment with each other to have the tip 13 fit within the recess 14. Prior to the bringing together of the ends 11 and 12 of the several bars A a coupling sleeve 15 which is made from a tubular section flattened into L formation is slipped over either the end 11 or 12 and then another bar is inserted at its end matching the previously inserted end of the first bar over which the said sleeve has been slipped, so that both ends of the several bars will interfit with each other within the sleeve 15 for the separably joining of the said bars.

The sleeve intermediate its ends has a cross rivet secured therein which intersects the joint between the interfitted ends of the bars engaged in the said sleeve, and this rivet prevents the spreading of the sleeve and maintains the walls of the latter in frictional contact with the inserted ends of the bars A in said sleeve 15.

Cut into the outer edges of the flanges 10 of the bars A are V-shaped notches 16, these being uniformly spaced apart and have intersecting the same angular slots 17, which align with the opposed edges of the said notches, so that there are spread entrances to the respective slots 17 at the free edges of the flanges 10 of the bars A. This enables the lashing of twine, string or cord 18 about the bar and a growing plant 19 next to the said bar A when driven or anchored in the ground.

The twine, string or cord 18 is inserted in the notches 16 to be trained or threaded through the slots 17, it being preferable to knot one end of the cord, string or twine so that it will not pull through the slot 17 in which it is initially engaged in the bar A and then said cord, string or twine can be conveniently spiraled, twisted or wrapped about the support or prop and the plant with the string, cord or twine either loosely or tightly drawn and the same seated in the slots 17, it being possible to reverse the spiral so that one stretch will run clockwise and the other stretch counter clockwise. It is also possible to use two lengths of twine, string or cord as a fastening medium for service with the support or prop A.

In the use of the sleeve 15 with several bars A the same can be easily and quickly spliced or separated and on the separation the said bars can be easily stored in the least space or readily shipped from one locality to another.

It is preferable to have the growing plant on the convex side of the bar, so that the pull effect of the plant will have a tendency to draw the twine, string or cord more deeply into the slots 17 to avoid possibility of the separation of the fastener from the support or prop.

The shape of the supports or props will enable the same to be nested for convenience in storage or shipment.

It is to be understood that changes, variations and modifications may be made in the support or prop as will fall properly within the scope of the appended claims without departing from the spirit of the invention or sacrificing any of its advantages.

What is claimed is:—

1. The combination of a plurality of angle irons, each having entrance notches in the free side edges and also reversely angled slots opening into said notches, and a coupling for separately joining together meeting ends of adjacent irons with each other when brought into alignment one with the other.

2. The combination of a plurality of angle irons, each having notches in the free side edges and also reversely angled slots opening into said notches, a coupling for separately joining together meeting ends of adjacent irons when brought into alignment with each other, and a lashing about each iron and received by the notches for seating in the slots.

3. The combination of a plurality of angle irons, each having entrance notches in its free side edges and also reversely angled slots opening into said notches, a coupling for separably joining together meeting ends of adjacent irons when brought into alignment with each other, and a lashing about each iron and received by said notches for seating in the slots, the irons each having substantially V-shaped opposite ends for interfitting of irons adjacent to each other when within the coupling.

4. In a support of the kind described, a channeled bar forming flanged sides, the latter being provided with entrance notches and also slots opening into the same and reversely angled to each other, one end of the bar having a tip receiving recess for another bar when aligned therewith, and a pointed tip at the other end of the bar.

SHIRLEY L. STARKEY.